(12) United States Patent
Rogers et al.

(10) Patent No.: US 10,057,849 B2
(45) Date of Patent: Aug. 21, 2018

(54) SYSTEM AND METHOD FOR REDUCING POWER CONSUMED OBTAINING SYSTEM INFORMATION FROM A CELL

(71) Applicant: Nvidia Corporation, Santa Clara, CA (US)

(72) Inventors: Timothy Rogers, Santa Clara, CA (US); Rene-Cedric Vanderbergh, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 333 days.

(21) Appl. No.: 14/728,301

(22) Filed: Jun. 2, 2015

(65) Prior Publication Data

US 2016/0360481 A1 Dec. 8, 2016

(51) Int. Cl.
*H04W 4/00* (2018.01)
*H04W 52/02* (2009.01)

(52) U.S. Cl.
CPC ... *H04W 52/0212* (2013.01); *H04W 52/0216* (2013.01); *Y02D 70/00* (2018.01); *Y02D 70/12* (2018.01)

(58) Field of Classification Search
CPC .............. H04W 52/0212; H04W 52/0216
See application file for complete search history.

(56) References Cited

U.S. PATENT DOCUMENTS

| | | | | |
|---|---|---|---|---|
| 2007/0260851 A1* | 11/2007 | Taha | ................. | H04W 52/0229 712/204 |
| 2009/0098892 A1* | 4/2009 | Trogolo | ................ | H04W 28/06 455/466 |
| 2012/0170515 A1* | 7/2012 | Patil | ...................... | H04W 48/12 370/328 |
| 2014/0155043 A1* | 6/2014 | Gell | ...................... | H04W 4/003 455/414.1 |

* cited by examiner

*Primary Examiner* — Samina Choudhry
(74) *Attorney, Agent, or Firm* — Kevin Brown; Parker Justiss, P.C.

(57) ABSTRACT

A system for, and method of, reducing power consumed obtaining system information from a cell, the system information contained in at least a master information block, a scheduling information block and a system information block. In one embodiment, the system includes: (1) a broadcast control channel (BCCH) frame cache configured to buffer received BCCH frames bearing portions of the system information and (2) a system information verifier associated with the BCCH frame cache and configured to determine version consistency in the master information block and the scheduling information block by employing the check numbers associated therewith.

20 Claims, 4 Drawing Sheets

FIG. 3A

| SIB SEQUENCE ON BCCH | | | BCCH BLOCK CACHE STATUS | BCCH FRAMES WITH RECEIVER ENABLED | | |
|---|---|---|---|---|---|---|
| SFN' | SI TYPE | SEGMENT NUMBER | | WITH CACHE | WITHOUT CACHE | WITH BCCH DECODE ERROR |
| 1 | MIB | | | | | |
| 2 | SIB1 | | | | | |
| 3 | SIB3 | | | | | |
| 4 | SIB5 | 1 | | | | |
| 5 | MIB | | | | | |
| 6 | SIB5 | 2 | | | | |
| 7 | SIB5 | 3 | | | | |
| 8 | SB1 | | | | | |
| 9 | MIB | | | | | |
| 10 | SIB1 | | | | | |
| 11 | SIB11 | 0 | | | | |
| 12 | SIB11 | 1 | | | | |
| 13 | MIB | | | | | |
| 14 | SIB11 | 2 | | | | |
| 15 | SIB11 | 3 | | | | |
| 16 | SIB11 | 4 | | | | |
| 17 | MIB | | | | | |
| 18 | SIB1 | | | | | |
| 19 | SIB3 | | | | | |
| 20 | SIB5 | 1 | | SIB ACQUIRED | | |
| 21 | MIB | | | | | |
| 22 | SIB5 | 2 | | | | |

TO FIG. 3B

FIG. 3B

SYSTEM AND METHOD FOR REDUCING POWER CONSUMED OBTAINING SYSTEM INFORMATION FROM A CELL

TECHNICAL FIELD

This application is directed, in general, to mobile telecommunications and, more specifically, to a system and method for reducing power consumed during the process of obtaining system information from a cell.

BACKGROUND

According to standards set by the 3rd Generation Partnership Project (3GPP), user equipment (UE) is required to read a cell's "system information" before selecting it for communication. The 3GPP standard specifies that system information is to be divided into blocks, currently consisting of a Master Information Block (MIB) and one or more Scheduling information Blocks (SB) and System Information Blocks (SIBS).

Fixed-length Broadcast Control CHannel (BCCH) Service Data Unit (SDU) frames are used to convey the various blocks that constitute the system information. Because the various blocks of the system information may be longer than one BCCH frame, the blocks may be segmented and concatenated to fit into the frames. A typical set of system information blocks requires 20 or more BCCH frames to broadcast.

Cells broadcast their system information in a loop, typically repeating the MIB, SB(s) and SIB(s) multiple times in each loop. A typical loop may be 32 or 64 BCCH frames long, and each BCCH frame requires about 20 ms to broadcast. Consequently, a UE typically requires about ½ to one second to acquire a full set of system information.

The system information of a certain cell is subject to change over time. Thus a version number, known as a value tag, is applied to each block of system information. When any of the contents of a block is changed, the value tag of that block is changed, and the value tag of the MIB is changed as well. If the block in which the change occurs happens to be the MIB, only the value tag of the MIB is changed. UEs are notified of a change to system information by paging.

SUMMARY

One aspect provides a system for reducing power consumed obtaining system information from a cell. In one embodiment, the system includes: (1) a BCCH frame cache configured to buffer received BCCH frames bearing portions of the system information and (2) a system information verifier associated with the BCCH frame cache and configured to determine version consistency in the MIB and the SB of the system information by employing the check numbers associated therewith.

In another embodiment, the system includes: (1) a BCCH frame cache configured to buffer received BCCH frames bearing portions of the system information contained in at least the MIB, the SB and the SIB and (2) a system information verifier associated with the BCCH frame cache and configured to determine version consistency in the MIB and the SB by employing the check numbers associated therewith.

Another aspect provides a method of reducing power consumed obtaining system information from a cell. In one embodiment, the method includes: (1) buffering received BCCH frames bearing portions of the system information and (2) determining version consistency in the MIB and the SB by employing the check numbers associated therewith.

BRIEF DESCRIPTION

Reference is now made to the following descriptions taken in conjunction with the accompanying drawings, in which:

FIGS. 3A and 3B are a diagram of one embodiment of a buffer contained in a memory of the UE of FIG. 2, together with various examples of buffered BCCH frames.

DETAILED DESCRIPTION

As stated above, a UE typically requires about ½ to one second to acquire a full set of system information. Given the fact that system information may change over time, conventional UEs obtain system information in sequence, that is, they receive the BCCH frames bearing all of a given set of system information continuously, one frame after another.

It is realized herein that while obtaining a cell's system information continuously addresses the problem of changing versions, it consumes significant (typically battery) power. This is because the UE's receiver must be powered up to receive the BCCH frames.

It is further realized herein that power could be saved were a UE to obtain system information while its receiver was already powered up for other reasons, for example when the UE is receiving data for a user. However, it is yet further realized herein that the receiver is not guaranteed to remain operable during the time required to receive the BCCH frames bearing all of a given set of system information. In other words, a receiver may power down while needed BCCH frames are being broadcast.

It is still further realized that the UE may be augmented with a buffer to store BCCH frames as they are received. This allows missing BCCH frames to be obtained and filled in later, when the receiver is again powered up. However, it is yet still further realized that, even with a buffer, the version of the BCCH frames could not be guaranteed to be the same from one frame to another. It is further not guaranteed that the BCCH frames were broadcast from the same cell. It is therefore realized that the structure 3GPP standards specify for system information provides no mechanism for determining the version or cell to which a particular BCCH frame belongs. The value tags of the various blocks are of no use, because they are not associated with each BCCH frame.

Introduced herein are novel systems and methods for reducing power consumed by a UE obtaining system information from a cell. According to various embodiments disclosed herein, the system and method associate a check number, which may be a hash or other content-dependent number or an independently derived number, with each BCCH frame. As BCCH frames are obtained over time, their check numbers may be compared to determine whether or not the BCCH frames are of the same version and therefore cell. Once an entire set of system information is obtained, the receiver is no longer needed for that purpose, and power may be saved.

Figure 1:
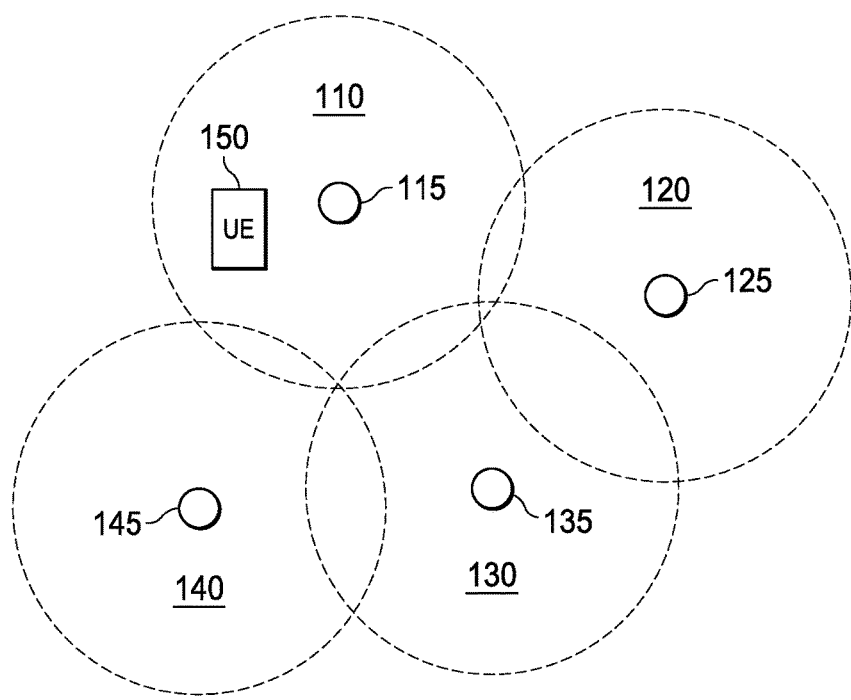
FIG. 1 is a diagram of one embodiment of a telecommunications infrastructure having a plurality of cells and at least one UE that can select among and communicate with the cells.

FIG. 1 is a diagram of one embodiment of a telecommunications infrastructure having a plurality of cells and at least one UE that can select among and communicate with the cells. In this embodiment, a plurality of cells 110, 120, 130, 140 each have of a cell transmitter 115, 125, 135, 145 configured to transmit BCCH frames. The UE 150 is configured to receive the BCCH frames transmitted by the cell transmitters.

Each cell transmitter 115, 125, 135, 145 are configured to broadcast BCCH frames over various ranges defining the footprint of the cells 110, 120, 130, 140. These cells may overlap with the footprint of other cells. The areas of overlap may include BCCH frames containing the different system information that a UE 150 would need receive and evaluate.

As the UE 150 traverses the broadcast area of each cell transmitter, the UE receives a set of broadcast BCCH frames containing that cell's system information. In positions of cell overlap, the UE 150 receives two sets of system information: information from the cell the UE 150 is exiting, and information the cell the UE 150 is entering.

In this embodiment, each of the transmitting cells, are configured to generate a check number for a system information block, and include it as a payload in a MIB or SB.

Figure 2:
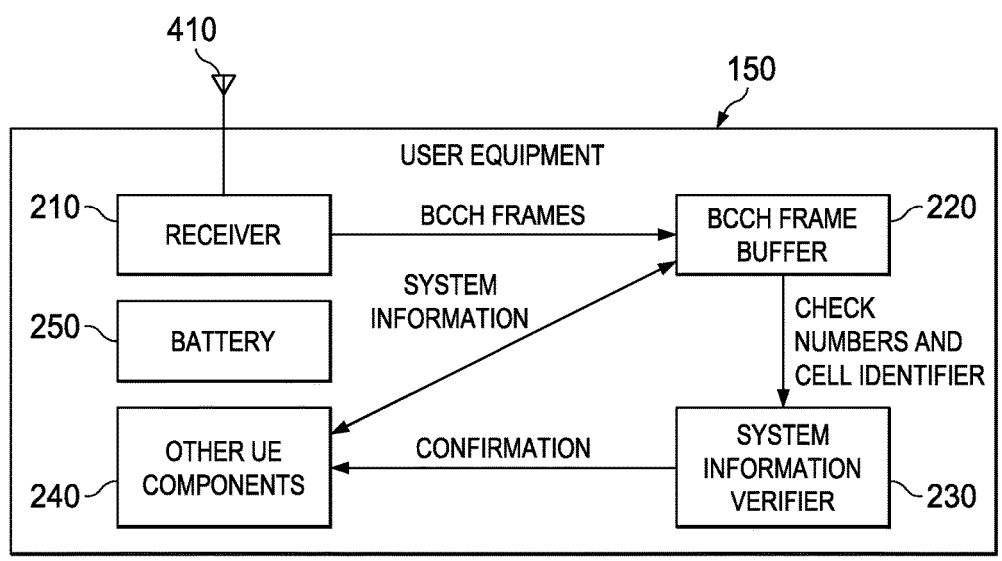
FIG. 2 is a diagram of one embodiment of a UE of FIG. 1 including a system for reducing power consumed obtaining system information from a cell.

FIG. 2 is a diagram of one embodiment of a UE of FIG. 1 including a system for reducing power consumed obtaining system information from a cell. The UE 150 includes a receiver 210, a BCCH frame buffer 220, a system information verifier 230, other UE components 240, and a battery 250.

The receiver 210 is configured to receive BCCH frames. The implementation of the receiver may be but is not limited to radio frequency as implemented in modern cell networks. The received BCCH frames are then buffered, or stored in a BCCH frame buffer 220. The method of buffering internal to the BCCH frame buffer, may be but is not limited to a ring buffer similar in size and scope to the BCCH frame sequence necessary to convey the system information.

The system information verifier 230 uses the stored BCCH frames contained in the BCCH frame buffer 220 to generate a check number based on all the frames necessary to convey the system information. The check number can be implemented in many conventional or later-developed ways and is not limited to hashes or checksums.

Upon generation of the check number, confirmation of the system information is accomplished by a comparison of the check number carried in payload of the scheduling block or the master information block. Once verified other UE components 240 can use fully the correctly verified system information. The battery 250 provides operational power for all the subcomponents of the UE.

Figure 3B:
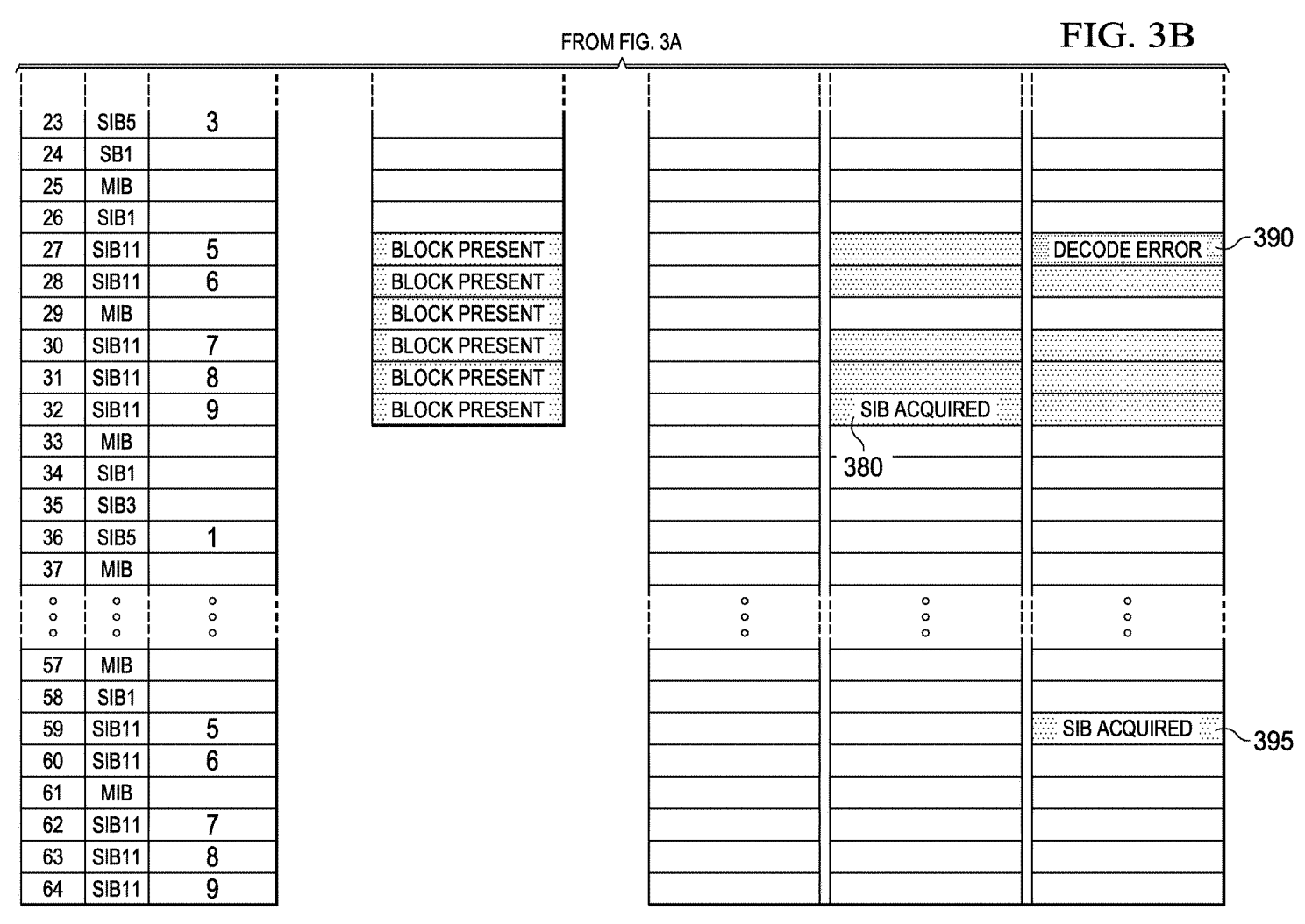

FIGS. 3A and 3B are a diagram of one embodiment of a buffer contained in a memory of the UE of FIG. 2, together with various examples of buffered BCCH frames.

A "SIB sequence on BCCH" table 310 is an example sequence the repeated BCCH frames transmitted by a cell, providing system information blocks. In this embodiment, there are 32 frames before the transmission repeats. It is apparent that, SIB11, one block of interest, is segmented over ten BCCH frames. In order to extract the system information correctly, all ten frames of the SIB11 block should be received.

A "BCCH block cache status" table 320 is a representation of the BCCH frames received from the cell transmission. It is important to note, in this embodiment, the UE receives the BCCH frames midway through the repeated sequence, starting at SFN' 27. As the "BCCH block cache status" table 320 indicates, the received frame is inserted into the cache upon receipt.

A "BCCH frames with receiver enabled" table 330 demonstrates three examples in which system information is extracted from the BCCH frame sequence. It is important to note that the data acquired from SFN' 27, remains in the BCCH frame cache during the next repeated BCCH frame sequence.

A leftmost column 340 of the BCCH frames with receiver enabled table 330 provides an example of obtaining system information when a BCCH cache is present along with the teachings herein. As the sequence repeats, the receiver inserts BCCH frames into the BCCH frame cache starting at SFN' 1. The receiver repeats this until SFN' 16, at which the SIB acquired 370. At SFN' 16, the receiver has all of the frames necessary to generate a check number for verification for SIB11: segments 5-9 were already in cache, and segments 0-4 were inserted during the next BCCH SDU sequence.

A middle column 350 of the BCCH frames with receiver enabled table 330 provides an example of obtaining system information when a BCCH cache is absent. As the sequence repeats, the receiver inserts the BCCH frames into the BCCH frame cache starting at SFN' 1. Since the cached frames are not available, SIB11 cannot be acquired until all the segments have been received. This does not occur until SFN' 32 380. At SFN' 32, the receiver has all of the frames necessary to generate a check number for SIB11: segments 0-9 were inserted in the next BCCH SDU sequence and none of the segments from a previous sequence were used.

A rightmost column 360 is an illustration of the acquisition without the benefit of any embodiment of the invention. When the CRC error occurs on the BCCH frame without the benefit of any embodiment of the invention, the SIB acquisition completes at SFN'59 395. Since no cached frames are available, SIB11 cannot be acquired until all the segments have been received. In this illustration, the receiver encounters a frame decode error at SFN' 27 390. This frame cannot be used for generating the check number, yet still must be obtained to acquire the system information. This does not occur until SFN' 59 395. At SFN' 59, the receiver has all of the frames necessary to generate a check number for SIB11: segments 0-4, 6-9 were inserted in the next BCCH SDU sequence and segment 5 is inserted in the subsequent sequence following the decode error. None of the frames from a previous sequence were cached for use in generating the check number.

Figure 4:
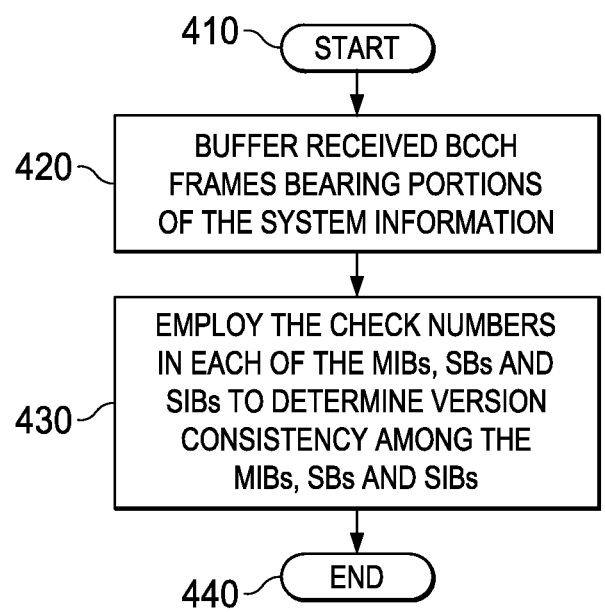
FIG. 4 is a flow diagram of one embodiment of a method of reducing power consumed obtaining system information from a cell.

FIG. 4 is a flow diagram of one embodiment of a method of reducing power consumed obtaining system information from a cell. The method begins in a start step 410. In a step 420, received BCCH frames bearing portions of the system information are buffered. In a step 430, the check numbers in each of the MIBs, SBs and SIBs are reconstructed from their corresponding transport block BCCH frames and are employed to determine version consistency among the MIBs, SBs and SIBs. The method ends in an end step 440.

Those skilled in the art to which this application relates will appreciate that other and further additions, deletions, substitutions and modifications may be made to the described embodiments.

What is claimed is:

1. A system for reducing power consumed from a battery when obtaining system information from a cell, said system information contained in at least a master information block, a scheduling information block and a system information block, said system comprising:
- a receiver;
- a broadcast control channel (BCCH) frame cache configured to buffer received BCCH frames from the receiver bearing portions of said system information;
- wherein said system is configured to determine version consistency in said master information block and said scheduling information block for each of said BCCH frames by employing check numbers associated therewith.

2. The system as recited in claim 1 wherein said check numbers are functions of said master information block and said scheduling information block with which said check numbers are associated.

3. The system as recited in claim 2 wherein said check numbers are hashes.

4. The system as recited in claim 1 wherein said check numbers associated with said at least one scheduling information block and said at least one system information block are included in said master information block and said at least one scheduling information block.

5. The system as recited in claim 1 wherein said system is further configured to employ a cell identifier associated with said cell to verify that said system information is appropriate for said cell.

6. The system as recited in claim 1 wherein said system is further configured to employ said check numbers to confirm that previously obtained system information is current.

7. The system as recited in claim 1 wherein said check numbers are contained in headers of said master information block and said scheduling information block.

8. A method of reducing power consumed from a battery when obtaining system information from a cell, said system information contained in at least a master information block, a scheduling information block and a system information block, said method comprising:
- buffering received broadcast control channel (BCCH) frames bearing portions of said system information; and
- determining version consistency in said master information block and said scheduling information block for each of said BCCH frames by employing check numbers associated therewith.

9. The method as recited in claim 8 wherein said check numbers are functions of blocks with which said check numbers are associated.

10. The method as recited in claim 9 wherein said check numbers are hashes.

11. The method as recited in claim 8 wherein said check numbers associated with said at least one scheduling information block and said at least one system information block are included in said master information block and said at least one scheduling information block.

12. The method as recited in claim 8 further comprising employing a cell identifier associated with said cell to verify that said system information is appropriate for said cell.

13. The method as recited in claim 8 further comprising employing said check numbers to confirm that previously obtained system information is current.

14. The method as recited in claim 8 wherein said check numbers are contained in headers of said master information block and said scheduling information block.

15. A system for reducing power consumed from a battery when obtaining system information from a cell, said system information contained in at least a master information block, a scheduling information block and a system information block, comprising:
- a receiver;
- a broadcast control channel (BCCH) frame cache configured to buffer received BCCH frames from the receiver bearing portions of said system information contained in at least said master information block, said scheduling information block and said system information block;
- wherein said system is configured to determine version consistency in said master information block and said scheduling information block for each of said BCCH frames by employing check numbers associated therewith.

16. The system as recited in claim 15 wherein said check numbers are functions of blocks with which said check numbers are associated.

17. The system as recited in claim 16 wherein said check numbers are hashes.

18. The system as recited in claim 15 wherein said check numbers associated with said at least one scheduling information block and said at least one system information block are included in said master information block and said at least one scheduling information block.

19. The system as recited in claim 15 wherein said system is further configured to employ a cell identifier associated with said cell to verify that said system information is appropriate for said cell.

20. The system as recited in claim 15 wherein said system is further configured to employ said check numbers to confirm that previously obtained system information is current.

* * * * *